United States Patent [19]

Ishimitsu et al.

[11] 4,245,804
[45] Jan. 20, 1981

[54] MINIMUM DRAG WING CONFIGURATION FOR AIRCRAFT OPERATING AT TRANSONIC SPEEDS

[75] Inventors: Kichio K. Ishimitsu, Mercer Island; Neal R. Van Devender, Renton, both of Wash.

[73] Assignee: The Boeing Company, Seattle, Wash.

[21] Appl. No.: 862,286

[22] Filed: Dec. 19, 1977

[51] Int. Cl.² ............................................. B64C 5/08
[52] U.S. Cl. ..................................... 244/91; 244/199
[58] Field of Search ................... 244/91, 198, 199, 15; D12/71, 81

[56] References Cited

U.S. PATENT DOCUMENTS 2,576,981  12/1951  Vogt ....................................... 244/91

OTHER PUBLICATIONS von Braun, "Fuel-Saving Aircraft", *Popular Science*, 9/1976, pp. 80-83 & 161.
"Concepts for Aircraft Drag Reduction", Hefner et al., 3/28-4/1/1977.
"Gulfstream III Analysis", *Flight International*, 12/4/1976, pp. 1623-1624.
*Gulfstreamer*, vol. 5, No. 6, Winter 1976.

*Primary Examiner*—Barry L. Kelmachter
*Attorney, Agent, or Firm*—Christensen, O'Connor, Johnson & Kindness

[57] ABSTRACT

A wing extension or tip fin is disclosed wherein the tip fin is joined to an aircraft wing to form a nonplanar wing configuration which minimizes induced drag during both low speed and high speed operation of an aircraft. The tip fin which is of generally trapezoidal geometry, extends streamwise along the end of the aircraft wing and is canted to project upwardly and outwardly therefrom. Additionally, the tip fin is twisted to toe-out relative to the freestream direction with the angle of twist varying along the lower portion of the tip fin length. Viewed from the side, the tip fin has a sweep angle at least equal to the sweep angle of the aircraft wings with the leading edge of the tip fin intersecting the wing tip chord at a position aft of the wing leading edge. A strake which extends along the upper surface of the wing from the wing leading edge to the tip fin leading edge, forms a smooth transition between the wing and tip fin. To provide maximum aerodynamic efficiency, the length and cant angle of the tip fin are established to reduce the induced drag of the wing-tip fin combination below that exhibited by the wing alone or by a conventional wing of area and span equivalent to that of the combined wing-tip fin. Interference and compressibility drag of the combined wing-tip fin is minimized by controlling the chordwise position of the tip fin and by the strake which not only provides an aerodynamically smooth wing to tip fin transition, but establishes a vortical flow pattern that maintains boundary layer attachment under high speed flight conditions. Further, the area of the tip fin is established for minimum profile drag, the variation in tip fin thickness ratio further minimizing interference drag and the tip fin twist compensates for spanwise loading on the wing to reduce induced drag.

15 Claims, 10 Drawing Figures

MINIMUM DRAG WING CONFIGURATION FOR AIRCRAFT OPERATING AT TRANSONIC SPEEDS

The Government has rights in this invention pursuant to Contract No. F33615-75-C-3123 awarded by the United States Air Force.

BACKGROUND OF THE INVENTION

This invention relates to high efficient aerodynamic lifting surfaces. More particularly, this invention relates to airfoils such as wings and control surfaces which are configured to reduce or minimize induced drag.

It has long been recognized in the art that the aerodynamic efficiency of a lift producing airfoil such as an aircraft wing is affected not only by the profile drag of the airfoil, but by a drag component commonly called induced drag. This induced drag results from the pressure on the upper and lower surfaces of the wing and, from the airflow direction caused by the lift producing wing-like structure. With respect to induced drag, this airflow is most significant at and near the ends or tips of the wings since the pressure differential produces airflow that is transverse to the stream of lift-producing air. Since induced drag is most significant at the wing tips, it has been recognized in the art that, considering a wing having an area S, the aerodynamic efficiency can be increased by increasing the length of the wing, i.e., maximizing the wing aspect ratio $b^2/S$, where b is the wing span.

Simply increasing the wing span to decrease the effect of induced drag and thereby increase aerodynamic efficiency is subject to structural constraints which limit the efficiency increases that can be attained. For example, to achieve structural integrity of the aircraft, the thickness of the wing structure must be increased as the wing is made longer. Such an increase in thickness increases the weight of the wing. Not only does the increase in profile drag which results from increasing wing aspect ratio detract from efficiency gains effected by a higher wing aspect ratio, but a point is eventually reached where the increase in profile drag totally offsets the benefits attained by a higher aspect ratio. Further, the attendant increase in wing weight often means that the wing must be operated at a higher coefficient of lift $C_L$ in order to provide the desired aircraft performance. Since the induced drag term is not only an inverse function of the wing aspect ratio, but is also directly proportional to $C_L^2$, it can again be seen that high aerodynamic efficiency cannot be attained simply by increasing wing aspect ratio.

Because of the limitations associated with planar wings of increased aspect ratio, various other means of decreasing induced drag have been proposed. For example, in U.S. Pat. No. 1,724,110, which issued to E. G. Reid, on Aug. 13, 1929, relatively thin fins or shields that extend streamwise along the wings and project outwardly from the wing surfaces to prevent or impede transverse flow along the wing surfaces are utilized. In this respect, endplates that project orthogonally above and below the wing tips are disclosed along with similarly constructed shields or plates that can be utilized at various locations along the wingspan.

Additionally, in U.S. Pat. No. 3,270,988, which issued to C. D. Cone, Jr., on Sept. 6, 1966, various other nonplanar wing designs are described, which increase the effective aspect ratio of the wing to thereby attain higher aerodynamic efficiency. More specifically, although the disclosure of the Cone patent is primarily addressed to apparatus and methods for analyzing nonplanar wing configurations with respect to ascertaining the effective aspect ratio and thereby determine the aerodynamic efficiency of the configuration, varius nonplanar wing geometries are suggested within this patent. Among these wing configurations are tubular sections of circular and elliptical cross-sectional geometry which are mounted at the tips of the planar wing with the axis of such tubular sections being substantially parallel to the flow direction of the freestream air and, a nonplanar wing which is divided at the tip into a number of branches that extend arcuately upward such that the wing terminus is effectively a number of "winglets" of different curvature which radiate from a planar wing.

Although endplates and other structures that have been previously proposed are generally satisfactory with respect to low speed aircraft, various disadvantages and drawbacks have prevented such apparatus from being incorporated in the design of modern high-speed aircraft. First, since modern high-speed aircraft are generally designed to operate at relatively high coefficients of lift, the profile drag associated with endplates or other nonplanar wing geometries is of even greater importance than it is with respect to low speed aircraft. Further, since such endplates are located in and influence the flow field of the wing, interference drag is created which at least partially cancels the benefits achieved by decreasing induced drag. Such interference drag often increases and becomes more of a problem in high speed aircraft since flow separation can easily occur at the boundary or transition between the wing and endplate structure. Additionally, since such high speed aircraft generally cruise at transonic flight velocities, shock waves can be induced by such boundary or transition regions which result in compressibility drag that can completely offset any increase in aerodynamic efficiency that is effected under low speed conditions. Even further, and especially with respect to nonplanar configurations in which the structure for reducing induced drag also provides lift, the spanwise pressure distribution along the wing can be affected to greatly increased wing bending moments. For example, not only does the weight increase that is often brought about by the use of endplates increase the wing bending moment, but if the section of the wing which reduces induced drag also produces lift, such as the branched winglet arrangement in the patent to Cone, further increases in bending moments occur.

Because of the above-mentioned drawbacks and others, there has been relatively little interest in applying endplates (or, as they have come to be called, tip fins or winglets) to modern high speed aircraft until the potential exhaustion of petroleum resources became apparent and, as a consequence, the cost of aircraft fuel increased. Recognizing that an increase in aircraft operating efficiency not only conserves fuel, but is important in providing aircraft that can be operated economically, those skilled in the art have thus begun to consider the design of more efficient aircraft engines and aircraft structure.

In this respect, it should be noted that both the military and commercial operators of high speed aircraft presently possess a substantial number of such aircraft and a large number are also currently in production. Thus, not only are designs necessary and desirable for a new generation of highly efficient aircraft, but designs are required for retrofitting to existing aircraft and for incorporation in aircraft currently being produced without requiring major design changes.

Accordingly, it is an object of this invention to provide a nonplanar wing configuration which exhibits high aerodynamic efficiency on both low speed and high speed flight of the aircraft.

It is another object of this invention to provide a wing configuration wherein induced drag is reduced relative to a conventional wing of the same aspect ratio and wherein a wing tip fin produces minimal profile drag and causes minimal interference and compressibility drag.

It is yet another object of this invention to provide a wing tip fin for reducing induced drag wherein a tip fin is also configured for causing minimal increase in wing bending moment normally attendant to adding structure to the outboard portions of the wing.

Even further, it is an object of this invention to provide a wing tip fin of the above-described type which is readily incorporated in present aircraft designs and readily retrofitting to existing high speed aircraft.

SUMMARY OF THE INVENTION

These and other objects are achieved in accordance with this invention by a tip fin that is joined to the end portion of the wing of an aircraft to form an upwardly and outwardly projecting extension of the wing. Viewed from the side, the tip fin is generally trapezoidal in geometry with the leading edge of the tip intersecting the wing at a position aft of the wing leading edge. A fairing or strake extends rearwardly along the upper surface of the wing from the leading edge of the wing to the leading edge of the tip fin to form an aerodynamically smooth transition between the wing and the tip fin and control airflow within the transition region.

As the tip fin extends upwardly and outwardly from the wing, the tip fin is not of constant airfoil section, but slightly decreases in camber over at least the lower portion of the tip fin. Additionally, the angle of incidence between the free stream air and the tip fin is not constant relative to the tip fin length. Rather, the tip fin includes twist such that, when the tip fin is viewed along its chordal plane, the root chord of the tip fin is directed outwardly or "toed-out" relative to the freestream direction by a predetermined twist angle with the twist angle smoothly decreasing over at least the lower portion of the tip fin length.

In accordance with this invention, the outward projection or cant angle of the tip fin and the length of the tip fin relative to the semispan of the aircraft are established to provide greatly reduced induced drag relative to that of the wing alone. Further, the maximum thickness ratio of the tip fin and the variation in camber along with the variation in twist angle being established to further reduce induced drag. Additionally the leading edge sweep angle of the strake is established to create flow vortices which maintain boundary layer attachment througout the interface region between the wing and the tip fin to thereby further minimize interference and compressibility drag. Even further, the tip fin area, taper ratio, and leading edge sweep angle are established to minimize tip fin profile drag and interference drag, with the position at which the tip fin leading edge intercepts the wing chord also being controlled to further minimize induced drag.

BRIEF DESCRIPTION OF THE DRAWINGS

Other objects and advantages of this invention will be apparent to one skilled in the art after a reading of the following description with referencce to the accompanying drawings in which:

FIG. 4 depicts streamwise airfoil sections of the tip fin of FIGS. 2 and 3, with FIG. 4a depicting the cross-sectional geometry of the tip fin between the section line 4A—4A of FIG. 3, and the upper terminus of the tip fin, FIG. 4b depicting the cross sectional geometry along the section line 4B—4B of FIG. 3, and FIG. 4c depicting the tip fin cross-sectional geometry along the section line 4C—4C of FIG. 3;

DETAILED DESCRIPTION

Figures 1, 2, 3, 5:
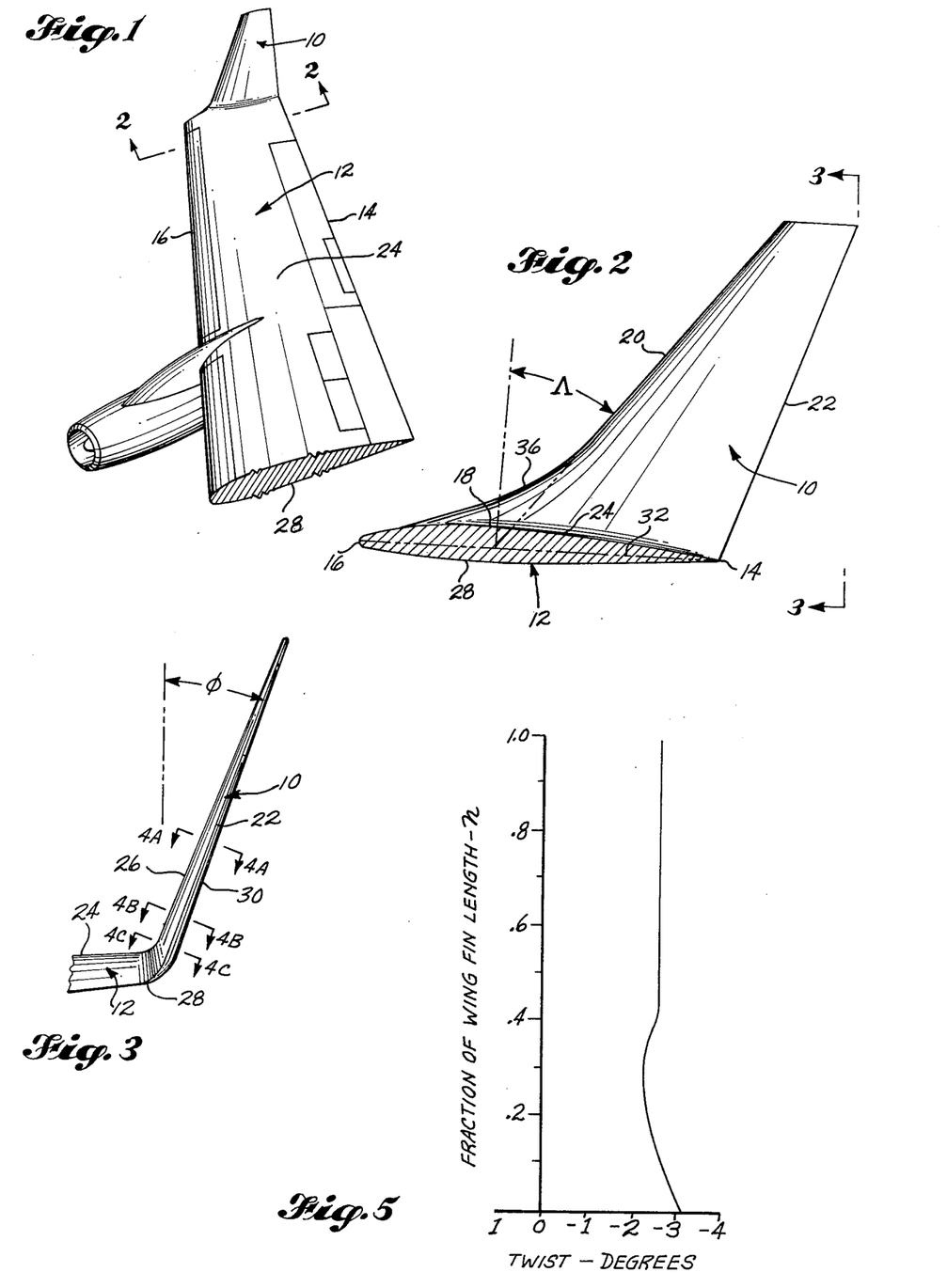
FIG. 1 is an isometric view of the outboard section of an aircraft wing which includes a tip fin constructed in accordance with this invention.
FIG. 2 is a planform view of the wing tip fin of FIG. 1.
FIG. 3 is a rear view of the combined wing and tip fin of this invention.
FIG. 5 is a graph which illustrates the twist distribution of one particular embodiment of the invention relative to the length of the tip fin; and, FIGS. 6, 7 and 8 graphically depict design constraints appropriate to embodying the present invention within high speed aircraft.

Referring now to FIGS. 1, 2 and 3, the tip fin of this invention effectively forms an extension of an aircraft wing to provide a nonplanar wing geometry having a tip section that projects upwardly and outwardly in a manner which minimizes induced drag and also minimizes interference and compressibility drag that is normally associated with nonplanar wing configurations. More specifically, and as can be seen in FIGS. 1 and 3, the tip fin (generally denoted by the numeral 10) extends outwardly and upwardly from the end portion of a wing 12 at an angle from the vertical which is denoted by $\phi$ in FIG. 3.

As can most clearly be seen in FIG. 2, when viewed from the side, the tip fin 10 is of a generally trapezoidal geometry with the base of the tip fin 10 extending from the trailing edge 14 of the wing 12 to a point aft of the wing leading edge 16. An aerodynamically smooth strake 18, which extends along the upper surface of the wing 12 from the wing leading edge 16 to the leading edge 20 of the tip fin 10 forms a smooth transition between the tip fin 10 and the wing 12. As shall become clear upon attaining a fuller understanding of the invention, the point at which the tip fin leading edge 20 (if extended as shown in FIG. 2) intercepts a chord located at the tip of the wing 12 is determined by the area of the tip fin 10 and by considerations relative to minimizing interference drag. Further, as shall be described in more detail hereinafter, the position at which the strake 18 intercepts the tip fin leading edge 20 (i.e., the leading edge sweep angle of the strake 18) is established such that flow vortices are created in the wing-tip fin interface region which maintain boundary layer flow attachment during high speed flight of the aircraft.

As can also be seen in FIG. 2, the tip fin leading edge 20 and the tip fin trailing edge 22 are inclined or swept relative to a vertical reference coordinate which is substantially perpendicular to the tip cord of the wing 12. In this respect, the tip fin leading edge angle ($\Lambda$ in FIG. 2) is usually on the order of 35 degrees and, since the tip fin 10 is located in the wing flow field should generally be at least as large as the sweep angle of the aircraft wings. It has been found, however, that substantial variation in the tip leading edge sweep angle can be effected without detrimentally affecting the drag characteristics of the invention, such variation being useful in controlling the position of the tip fin center of gravity to alleviate any wing flutter problems that may occur in a particular wing design. The angle formed by the tip fin trailing edge 22 is relatively unimportant to drag considerations of the invention and is established by other criteria such as the area of the tip fin and the tip fin taper ratio, i.e., the ratio of the length of the tip fin chord 34 to the length of the root chord 32.

As can be seen in FIG. 3, the interface region between the tip fin 10 and the wing 12 is radiused relative to the fore and aft directions to form a smooth boundary region between the upper surface 24 of the wing 12 and the inboard boundary surface 26 of the tip fin 10 and a smooth arcuate transition between the lower surface 28 of the wing 12 and the outboard boundary surface 30 tip fin 10. As can also be seen in FIG. 3, the cross-sectional area of the tip fin 10 decreases gradually over the length of the tip fin 10 to form a relatively thin smoothly rounded or other aerodynamically smooth surface at the upper terminus of the tip fin.

Figure 4A:
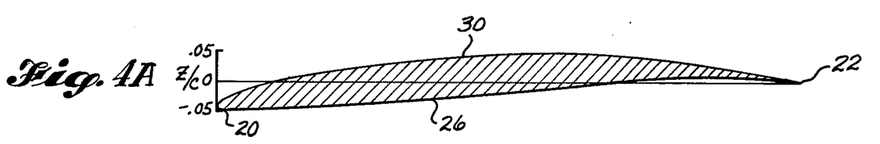
Figure 4B:
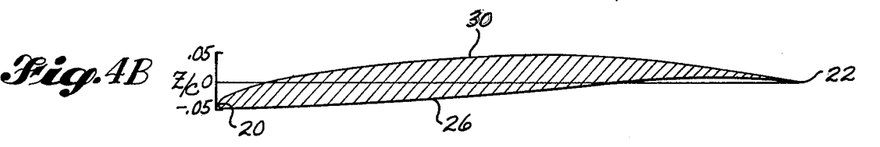
Figure 4C:
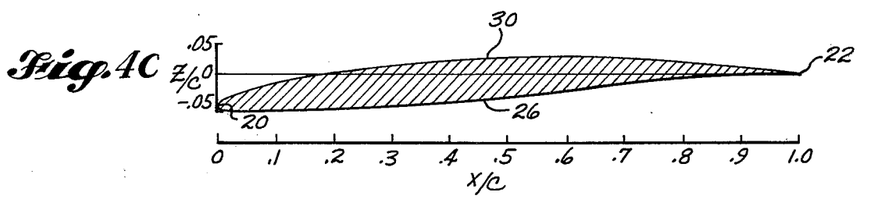

The variation is streamwise cross-sectional geometry along the length of an embodiment of the tip fin 10 of this invention is more specifically illustrated by FIGS. 4a, b and c, which depict the airfoil geometry of the tip fin at various locations along the tip fin length. In viewing FIGS. 4a, b and c, it should be recognized that the horizontal coordinate is a line that lies in the free stream direction which passes through the tip fin trailing edge 22 with this coordinate being graduated in terms of the decimal percent of chord length at the particular location depicted, i.e., X/C in FIG. 4. Further, the ordinate (Z/C) in FIGS. 4a, b and c represents the decimal ratio between the distance from the above noted reference coordinate to the inboard and outboard boundary surfaces 26 and 30 of the tip fin 10 and the chord length at that particular location. Thus, the tip fin airfoil sections depicted in FIG. 4 are normalized relative to chord length at each depicted location to clearly depict the relative thickness ratio (i.e., thickness divided by chord length) and the cross-sectional geometric configuration of the tip fin 10. As can be seen by comparing FIGS. 4a, b and c, the maximum thickness ratio of the streamwise airfoil section of the depicted embodiment of the tip fin 10 is substantially constant at each position along the length of the tip fin 10. To minimize the profile drag of the tip fin 10 under high speed flight conditions, it has been found advantageous to contour the boundary walls 26 and 30 such that the airfoil camber decreases gradually throughout the lower portion of the tip fin (i.e., $\eta=0$ to $\eta=0.417$ in FIG. 4, where $\eta$ is a normalized length parameter that is equal to the ratio between the distance from the tip fin root chord 32 to the position at which the depicted streamwise airfoil is taken and the total length 1 of the tip fin 10), and remains substantially constant throughout the upper portion of the tip fin 10. Further, by viewing the position of the tip fin leading edge 20 (X/C=0 in FIGS. 4a, b and c), it can be noted that the angle of incidence between the tip fin 10 and the freestream air varies over the lower portion of the tip fin length 1. More specifically, and with reference to FIG. 4, the root chord 32 of the tip fin 10 is effectively toed-out or twisted such that the tip fin leading edge 20 is outboard of the tip fin trailing edge 22 (i.e., is further from the centerline of the aircraft fuselage then the tip trailing edge). With reference to FIGS. 4b and 4c, it can be noted that the amount of toe-out or twist of the depicted embodiment generally decreases along the length of the tip fin 10 to the position $\eta=0.47$ and is substantially constant throughout the remaining length of the tip fin.

The twist relationship of the depicted embodiments is more clearly illustrated in the graph of FIG. 5 which depicts the angle of twist (i.e., the angle formed between the freestream direction and the chord of the tip fin 10) as a function of position along the tip fin length (i.e., $\eta$). As can be seen in FIG. 5, the twist angle is slightly in excess of $-3°$ (where the minus sign denotes twist away from the aircraft fuselage) at the base of the tip fin 10 ($\eta=0$) and gradually decreases to approximately $-2.2°$ at a position of approximately $\eta 0.3$. The twist angle then smoothly increases relative to position along the length of the tip fin to attain a value of approximately $-2.5°$ at the position $\eta=0.417$. As previously described, the twist angle remains substantially constant throughout the remaining length of the tip fin 10.

Having described the basic structure of a tip fin constructed in accordance with this invention, various parametric relationships of the invention will now be set forth so that those skilled in the art can recognize structural and dimensional relationships that are critical to maximizing the aerodynamic efficiency of an aircraft wing utilizing the invention.

Figure 6:
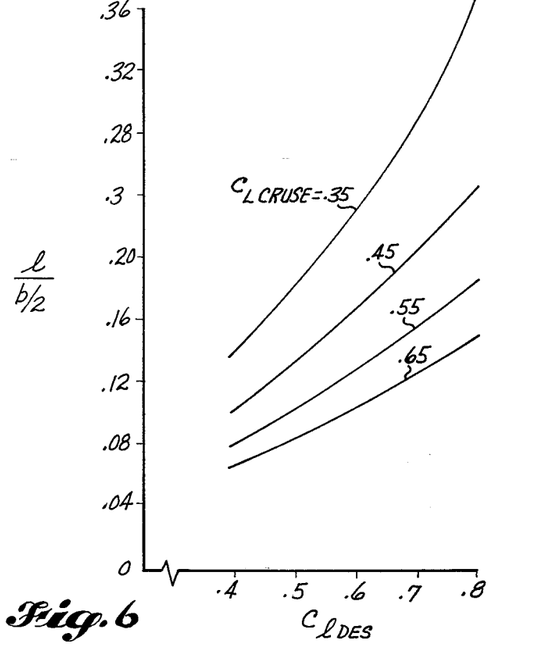

First, it has been found that the length 1 of the tip fin 10 and the cant angle $\phi$ are the most important dimensional parameters relative to minimizing induced drag. In particular, it has been determined that to achieve minimum induced drag, the ratio 1(b/2), where 1 is the tip fin length and b/2 is the semi-span of the aircraft, (i.e., the length of the wing 12), is directly related to the section design lift coefficient ($C_{IDES}$) and is inversely related to the wing cruise lift coefficient ($C_{LCRUISE}$) of the aircraft which is used to utilize the invention. In this respect, FIG. 6 provides an accurate estimate of the proper tip fin length for a range of $C_{IDES}$ between 0.4 and 0.8 and for cruise coefficients of lift equal to 0.35, 0.45, 0.55 and 0.65. Viewing FIG. 6, and considering the typical lift coefficients of transonic aircraft, it can be seen that the length ratio (1/(b/2)) of the tip fin of this invention ranges between 0.068 1/(b/2) and 0.25 1/(b/2) except for those very few aircraft which have a relatively high $C_{IDES}$ and which operate at relatively low $C_{LCRUISE}$.

In utilizing a tip fin having a length dimensioned in accordance with FIG. 6, it has been found that the cant angle $\phi$ should not exceed 25 degrees. In particular, although cant angles in excess of 25 degrees would sometimes appear to provide further reduction in induced drag, such cant angles cause undesirably high wing bending moments that would necessitate relatively thick wing structure to withstand high pressure loading. Further, the aircraft pitching moment also increases as a function of the cant angle $\phi$ and, with respect to cant angles in excess of 25 degrees, relatively large trim drag can be encountered to even further offset any potential reduction in induced drag.

As previously mentioned, high aerodynamic efficiency of a wing-tip fin combination cannot be effected simply by structuring the tip fin for maximum reduction in induced drag, but interference and compressibility drag that is caused by the structural interface or juncture between the tip fin 10 and the wing 12 must be minimized. In accordance with this invention, several dimensional and structural constraints are utilized to minimize interference and compressibility drag terms. First, as will be recognized by those skilled in the art, the transition between the tip fin 10 and the wing 12 must be aerodynamically smooth and structured such that shock waves are not generated under high speed flight conditions. In accordance with this invention, this criteria is met by the substantial radius formed between the upper surface 24 of the wing 12 and the inboard boundary surface 26 of the tip fin 10 and by the smooth arcuate transition between the lower surface 28 of the wing 12 and the outboard boundary surface 30 of the tip fin 10. Additionally, and as previously described, the strake 18 also provides an aerodynamically smooth transition between the leading edge 16 of the wing 12 and the leading edge 20 of the tip fin 10.

Beyond these general considerations, it has been found that the angle formed by the leading edge 36 of the strake 18 is of prime importance in effecting minimum interference and compressibility drag. In particular and referring again to FIG. 2, the leading edge 36 of the strake 18 is inclined or swept relative to the vertical such that a chord, drawn between the juncture of the strake 18 with the upper surface of the wing 12 and the juncture of the leading edge of the strake 18 with the leading edge 20 of the tip fin 10 is inclined at an angle of 55° to 75° relative to the vertical reference. In this respect, it has been discovered that utilizing such a sweep angle generates a vortical flow pattern along the base of the tip fin 10 which maintains boundary layer attachment during high speed flight to thereby prevent drag penalties that could at least offset the gains in aerodynamic efficiency effected by the invention.

Figure 7:
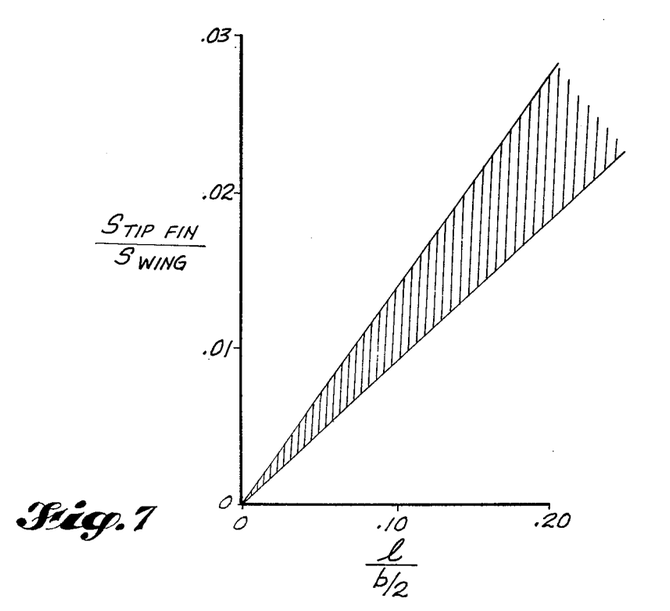

As previously noted, maximum aerodynamic efficiency of a nonplanar wing configuration which includes the tip fin 10 of this invention requires that the profile drag of the tip fin 10 be minimized. In this respect, it should be recognized that minimum profile drag can be effected by minimizing the area S of the tip fin 10 within the constraints imposed by the previously described length requirements and by other considerations. More specifically, the tip fin area S is geometrically a function of the tip fin length l, the leading edge sweep Λ and the tip fin taper ratio. Considering the previously set forth constraints on tip fin length and cant angle and the spanwise loading that the tip fin 10 exerts on the wing 12, it has been found that the ratio between the area of the tip fin 10 and the wing 12 should be within the shaded region of the graph of FIG. 7. More specifically, and with reference to FIG. 7, it can be seen that the ratio of the tip fin area to the area of the wing should be greater than or equal to 0.092 l/(b/2) and less than or equal to 0.138 l/(b/2). The exact tip fin area S that is utilized should fall within the above stated range and should be determined for each particular embodiment of the invention in view of secondary considerations which affect interference drag and/or tip fin profile drag. For example, it has been found that a slight improvement in interference drag can be attained when the projection of the tip fin leading edge 20 intersects the upper surface 24 of the wing 12 as far aft as possible. Additionally, the tip fin taper ratio should be maintained large enough to prevent flow separation which could be experienced if the sectional lift coefficients of the outboard or upper portion of the tip fin 10 became excessive. In this respect, it has been found that tip fin taper ratios, between 0.25 and 0.35 are generally satisfactory.

Figure 8:
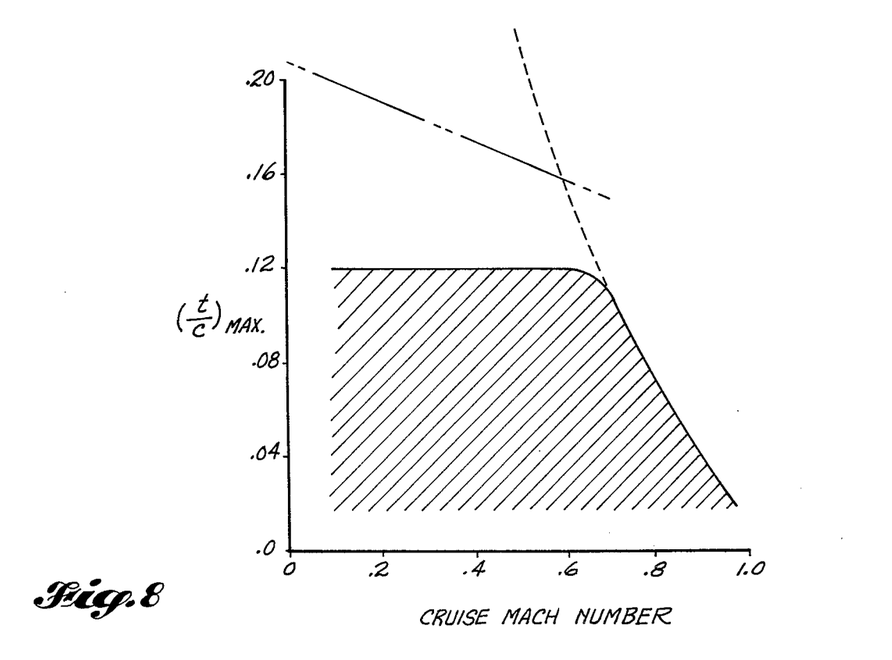

As previously described, the twist and the streamwise aerodynamic cross-sectional of the tip 10, including the variation in twist angle along the length of the tip fin, are primarily configured to minimize the loading effect of the tip fin 10 on the wing 12. Thus, it can be recognized that the exact thickness ratio and twist distribution are best determined by a consideration of the loading effects of the tip fin 10 on the wing 12 to which the tip fin is to be installed by experimentally varying these parameters to obtain as near to an optimum elliptical load distribution as is possible. However, since the tip fin cross-sectional geometry also affects interference and compressibility drag, it has been found that it is necessary to maintain the maximum thickness ratio of the tip fin 10 within a certain range which is graphically depicted in FIG. 8. Viewing FIG. 8, it can be observed that for an aircraft cruising at Mach 0.65 or less, the maximum thickness ratio should lie between 0.02 and 0.12, whereas for aircraft cruising at Mach 0.65 and higher, the maximum thickness ratio should be between 0.02 and approximately $0.12 + 0.4 \ (0.65 - M_C)$ where $M_C$ is the aircraft cruise velocity in Mach number.

In view of the previous description of the invention, it can be recognized that this invention is well suited for incorporation in existing aircraft designs and for retrofitting to aircraft presently in service to thereby improve aircraft operating efficiency and provide fuel savings. In particular, it can be recognized that, knowing the cruise coefficient of lift $C_{ICRUISE}$ and the section design lift coefficient $L_{IDES}$, the length of the tip fin (in terms of the ratio it bears to the semispan of the aircraft) can be determined from FIG. 7, the exact cant angle, tip fin area and maximum thickness ratio can then be determined along with the remaining geometric relationships in accordance with FIGS. 7 and 8 and the design considerations previously described herein.

The increase in aerodynamic efficiency typically attained with this invention can be exemplified by an embodiment of the invention which is configured for installation on a military transport aircraft which normally cruises at Mach 0.77 with a cruise coefficient of lift of approximately 0.426. In this embodiment, the twist distribution and the tip fin streamwise airfoil geometry corresponds to that depicted in FIGS. 4 and 5, with the length of the tip fin being 0.135 (b/2) and the tip fin being canted at an angle of 20° relative to the vertical. Utilizing these more critical dimensional values in the manner hereinbefore described, the total area of the tip fin (i.e., including the area of the trapezoidal region of FIG. 2 and the area encompassed by the strake 18) was established at approximately 1.5% of the aircraft wing area, the maximum thickness ratio was established at 0.066, the aspect ratio of the tip fin was established at approximately 2.33, the taper ratio was established at approximately 0.338, and the tip fin leading edge sweep angle was approximately 37°. An analysis of this particular embodiment of the invention revealed an estimated reduction in total aircraft drag of approximately 7.8 percent, which is estimated to provide a decrease in fuel consumption on the order of 8.1 percent. In this embodiment of the invention, the twist distribution of FIG. 5 limits the increase in wing root bending moment to less than approximately 4.5% to thereby permit installation of the tip fin without major modification of the aircraft wing.

The embodiments of the invention in which an exclusive property or privilege is claimed are defined as follows:

1. A tip fin mountable to the outboard end of an aircraft wing to form a nonplanar wing configuration for reducing induced drag relative to that exhibited by the wing alone, said tip fin having first and second boundary surfaces contoured to define an airfoil section including a leading edge, a trailing edge, a root chord and a tip chord, said tip fin leading edge extending between said tip fin root chord and said tip fin chord at a first predetermined angle, said tip fin trailing edge extending between said tip fin root chord and said tip fin tip chord at a second predetermined angle, said tip fin tip chord having a length dimension less than that of said tip fin root chord, said tip fin being mountable to said aircraft wing with said leading edge of said tip fin being positioned outboard of said tip fin trailing edge to define a predetermined angle of incidence between the freestream flow direction of said aircraft wing and said tip fin root chord, said tip fin being twisted over at least the lower portion of the distance between said tip fin root chord and said tip fin tip chord to gradually decrease the angle of incidence between said tip fin leading edge and said freestream flow direction within said lower portion of said distance between said tip fin root chord and said tip fin tip chord, said tip fin extending upwardly and outwardly at a predetermined cant angle from said outboard end of said aircraft wing when said tip fin is mounted thereto with said tip root chord extending streamwise relative to said end of said wing, said first boundary surface of said tip fin being contoured along said tip fin root chord to form a smoothly radiused transition between the upper surface of said wing and said tip fin first boundary surface, said second boundary surface of said tip fin being contoured along said tip fin root chord to form a smoothly radiused transition between the lower surface of said wing and said tip fin second boundary surface, said tip fin including a strake having an aerodynamically contoured leading edge extending at a third predetermined angle between said tip fin root chord and a point along said tip fin leading edge that is intermediate said tip fin root chord and said tip fin tip chord, said third predetermined angle being selected to establish airflow vortices for maintaining boundary layer attachment along said radiused transition between said upper surface of wing and said tip fin second boundary surface during flight of said aircraft, said strake having first and second boundary surfaces extending from said leading edge of said strake with said first and second boundary surfaces of said strake respectively terminating at and being contoured to form a smooth transition with said first and second boundary surfaces of said tip fin, said strake being dimensioned and arranged for extending streamwise along the upper surface of said wing when said tip fin is mounted to said aircraft wing.

2. The tip fin of claim 1 wherein said leading edge of said strake extends between said leading edge of said aircraft wing and said leading edge of said tip fin, said leading edge of said strake being disposed at an angle of between approximately 55° and 75° relative to a vertical reference.

3. The tip fin of claim 1 wherein the distance between said root chord and said tip chord is between approximately 0.068 (b/2) and approximately 0.25 (b/2), where b/2 is the semispan of said aircraft wing.

4. The tip fin of claim 3 wherein the maximum thickness ratio of said airfoil section defined by said first and second boundary surfaces of said tip fin is between approximately 0.02 and approximately $0.12 + 0.4(0.65 - M_C)$ and said tip fin is mounted to the wing of an aircraft having a typical cruise velocity greater than approximately Mach 0.65, where $M_C$ is the typical cruise velocity of the aircraft of which said tip fin is mounted.

5. The tip of claim 4 wherein the ratio of the surface area of said tip fin to the surface area of said aircraft wing is between 0.092 1/(b/2) and 0.138 1/(b/2), where 1 is the distance between said tip fin root chord and said tip fin tip chord and b/2 is the semispan of the wing to which the tip fin is mounted.

6. The tip fin of claim 5 wherein the ratio between said tip fin tip chord and said tip fin root chord is within the range of approximately 0.25 to approximately 0.35.

7. The tip fin of claim 3 wherein the maximum thickness ratio of said airfoil section defined by said first and second boundary surfaces of said tip fin is between 0.02 and 0.12 and said aircraft to which said tip fin is mounted typically cruises at a velocity less than approximately Mach 0.65.

8. A nonplanar wing configuration for minimizing induced drag comprising:

a conventional wing of substantially planar configuration having an upper surface and a lower surface, said upper and lower surfaces of said wing intersecting and joining one another to define a wing leading edge, a wing trailing edge and a wing tip;

a substantially trapezoidal tip fin mounted to said wing tip to extend upwardly and outwardly therefrom at a predetermined cant angle relative to a vertical reference, said tip fin having a base boundary extending chordwise along said upper surface of said wing, said tip fin having a leading edge extending upwardly and rearwardly at a predetermined angle relative to the chordal plane of said wing with said tip fin leading edge intersecting said upper surface of said wing at a position aft of said wing leading edge, said tip fin having an aerodynamically contoured upper boundary extending rearwardly from the upper terminus of said tip fin leading edge and having a trailing edge extending downwardly from the aft terminus of said upper boundary to the trailing edge of said wing, said tip fin being contoured to have a cross-sectional airfoil geometry relative to the streamwise direction throughout the distance between said tip fin base boundary and said tip fin upper boundary, said tip fin being mounted to said wing tip at a predetermined angle of incidence that positions said leading edge of said tip fin outwardly of said trailing edge of said tip fin, said tip fin being twisted over at least the lower portion thereof to gradually decrease the angle of incidence between said tip fin leading edge and said feedstream direction with respect to distance along said leading edge; and a strake mounted to extend streamwise between the leading edge of said wing and said leading edge of said tip fin, said strake having an aerodynamically contoured leading edge extending upwardly and rearwardly from said leading edge of said wing to a point on said leading edge of said tip fin intermediate said tip fin base boundary and said tip fin upper boundary to angularly dispose said strake leading edge at a predetermined angle relative to a vertical reference, said strake having first and second boundary surfaces extending from said leading edge of said strake with said first and second boundary surfaces of said strake respectively terminating in and being contoured to form a smooth transition with said tip fin, said predetermined angle of said strake leading edge being selected to establish airflow vortices for maintaining boundary layer attachment along the juncture between said tip fin base boundary and said wing.

9. The nonplanar wing configuration of claim 8 wherein the distance between said tip fin base boundary and said tip fin upper boundary is between approximately 0.068 (b/2) and approximately 0.25 (b/2), where (b/2) denotes the semispan of said aircraft wing.

10. The nonplanar wing configuration of claim 9 wherein said predetermined cant angle is less than 25°.

11. The nonplanar wing configuration of claim 10 wherein said angle formed between said leading edge of said strake and said vertical reference is between approximately 55° and 75°.

12. The nonplanar wing configuration of claim 11 wherein the ratio of the surface area of said tip fin to the surface area of said conventional wing is between 0.092 l/(b/2) and 0.138 l(b/2) where l is the distance between said tip fin base boundary and said tip fin upper boundary and (b/2) denotes the semispan of said conventional wing.

13. The nonplanar wing configuration of claim 12 wherein the maximum thickness ratio of said cross-sectional airfoil geometry is between approximately 0.02 and approximately $0.12 + 0.4 (0.65 - M_C)$ and the aircraft utilizing said nonplanar wing configuration typically cruises at a velocity greater than approximately Mach 0.65, where $M_C$ is the typical cruise velocity of the aircraft employing said nonplanar wing configuration.

14. The nonplanar wing configuration of claim 13 wherein the ratio between said tip fin upper boundary and said tip fin base boundary is within the range of approximately 0.25 to approximately 0.35.

15. The nonplanar wing configuration of claim 12 wherein the maximum thickness ratio of said cross-sectional airfoil geometry is between approximately 0.02 and approximately 0.12 and said aircraft using said nonplanar wing configuration typically cruises at a velocity less than approximately Mach 0.65.

* * * * *

UNITED STATES PATENT AND TRADEMARK OFFICE
CERTIFICATE OF CORRECTION

PATENT NO. : 4,245,804
DATED : January 20, 1981
INVENTOR(S) : Kichio K. Ishimitsu et al.

It is certified that error appears in the above-identified patent and that said Letters Patent are hereby corrected as shown below:

Column 2, line 5: "varius" is changed to --various--.

Column 3, line 23: "retrofitting" is changed to --retrofittable--.

Column 5, line 27: "is" is changed to --in--.

Column 6, line 3: "then" is changed to --than--.

Column 9, line 11: --tip-- is inserted after "fin".

Column 10, line 10: --fin-- is inserted after "tip".

Column 10, line 58: "fieldstream" is changed to --freestream--.

Signed and Sealed this

Twentieth Day of October 1981

[SEAL]

Attest:

GERALD J. MOSSINGHOFF

Attesting Officer    Commissioner of Patents and Trademarks

REEXAMINATION CERTIFICATE (2146th)
United States Patent [19]

Ishimitsu et al.

[11] B1 4,245,804

[45] Certificate Issued  Dec. 14, 1993

[54] MINIMUM DRAG WING CONFIGURATION FOR AIRCRAFT OPERATING AT TRANSONIC SPEEDS

[76] Inventors: Kichio K. Ishimitsu, Mercer Island; Neal R. Van Devender, Renton, both of Wash.

Reexamination Request:
No. 90/002,729, May 20, 1992

Reexamination Certificate for:
Patent No.: 4,245,804
Issued: Jan. 20, 1981
Appl. No.: 862,286
Filed: Dec. 19, 1977

Certificate of Correction issued Oct. 20, 1981.

[51] Int. Cl.$^5$ .............................................. B64C 5/08
[52] U.S. Cl. ...................................... 244/91; 244/199
[58] Field of Search .................... 244/198, 199, 91, 15; D12/71, 81

[56] References Cited

U.S. PATENT DOCUMENTS

| | | |
|---|---|---|
| 1,724,110 | 8/1929 | Reid . |
| 2,397,526 | 4/1946 | Bonbright . |
| 2,418,301 | 4/1947 | Heal . |
| 2,565,990 | 8/1951 | Richard . |
| 2,576,294 | 11/1951 | Geraci . |
| 2,576,981 | 12/1951 | Vogt . |
| 2,595,363 | 5/1952 | Lee . |
| 2,775,419 | 12/1956 | Hlobil . |
| 2,802,630 | 8/1957 | Birchill et al. . |
| 3,270,988 | 9/1966 | Cone, Jr. . |
| 3,411,738 | 11/1968 | Sargent . |
| 3,438,597 | 4/1969 | Kasper . |
| 3,463,419 | 8/1969 | Rashidian . |
| 3,845,918 | 11/1974 | White, Jr. . |
| 4,017,041 | 4/1977 | Nelson . |

FOREIGN PATENT DOCUMENTS

| | | |
|---|---|---|
| 546993 | of 1932 | Fed. Rep. of Germany . |
| 768392 | of 1934 | France . |
| 1250511 | of 1959 | France . |

OTHER PUBLICATIONS

"Fuel-Saving Aircraft," von Braun, *Popular Science*, Sep. 1976, pp. 80-83 & 161.

"Concepts for Aircraft Drag Reduction," Hefner et al., North Atlantic Treaty Organization Advisory Group for Aerospace Research and Development, AGAR-D-R-654 (Mar. 28-Apr. 1, 1977).

"Improving Aircraft Energy Efficiency," Povinelli et al., *Astronautics & Aeronautics*, Feb. 1976.

*Design and Anaylsis of Winglets for Military Aircraft*, U.S. Air Force technical report AFFDL-TR-76-6, Feb. 3, 1976.

*Primary Examiner*—Galen Barefoot

[57] ABSTRACT

A wing extension or tip fin is disclosed wherein the tip fin is joined to an aircraft wing to form a nonplanar wing configuration which minimizes induced drag during both low speed and high speed operation of an aircraft. The tip fin which is of generally trapezoidal geometry, extends streamwise along the end of the aircraft wing and is canted to project upwardly and outwardly therefrom. Additionally, the tip fin is twisted to toe-out relative to the freestream direction with the angle of twist varying along the lower portion of the tip fin length. Viewed from the side, the tip fin has a sweep angle at least equal to the sweep angle of the aircraft wings with the leading edge of the tip fin intersecting the wing tip chord at a position aft of the wing leading edge. A strake which extends along the upper surface of the wing from the wing leading edge to the tip fin leading edge, forms a smooth transition between the wing and tip fin. To provide maximum aerodynamic efficiency, the length and cant angle of the tip fin are established to reduce the induced drag of the wing-tip fin combination below that exhibited by the wing alone or by a conventional wing of area and span equivalent to that of the combined wing-tip fin. Interference and compressibility drag of the combined wing-tip fin is minimized by controlling the chordwise position of the tip fin and by the strake which not only provides an aerodynamically smooth wing to tip fin transition, but establishes a vortical flow pattern that maintains boundary layer attachment under high speed flight conditions. Further, the area of the tip fin is established for minimum profile drag, the variation in tip fin thickness ratio further minimizing interference drag and the tip fin twist compensates for spanwise loading on the wing to reduce induced drag.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–15 are cancelled.

New claims 16–30 are added and determined to be patentable.

16. *A method of creating a nonplanar wing configuration having reduced induced drag relative to that exhibited by the wing alone, comprising the steps of:*

(a) *mounting a tip fin on the outboard end of an aircraft wing, said tip fin having first and second boundary surfaces contoured to define an airfoil section including a leading edge, a trailing edge, a root chord and a tip chord, said tip fin leading edge extending between said tip fin root chord and said tip fin tip chord at a first predetermined angle, said tip fin trailing edge extending between said tip fin root chord and said tip fin tip chord at a second predetermined angle, said tip fin tip chord having a length dimension less than that of said tip fin root chord, said tip fin mounted to said aircraft wing such that said leading edge of said tip fin is positioned outboard of said tip fin trailing edge to define a predetermined angle of incidence between the freestream flow direction of said aircraft wing and said tip fin root chord;*

(b) *twisting said tip fin over at least the lower portion of the distance between said tip fin root chord and said tip fin tip chord so as to gradually decrease the angle of incidence between said tip fin leading edge and said freestream flow direction within said lower portion of said distance between said tip fin root chord and said tip fin tip chord, said tip fin extending upwardly and outwardly at a predetermined cant angle from said outboard end of said aircraft wing when said tip fin is mounted thereto with said tip fin chord extending streamwise relative to said end of said wing;*

(c) *contouring said first boundary surface of said tip fin along said tip fin root chord to form a smoothly radiused transition between the upper surface of said wing and said tip fin first boundary surface;*

(d) *contouring said second boundary surface of said tip fin along said tip fin root chord to form a smoothly radiused transition between the lower surface of said wing and said tip fin second boundary surface;*

(e) *creating a strake between said wind and said tip fin, said strake including an aerodynamically contoured leading edge extending at a third predetermined angle between said tip fin root chord and a point along said tip fin leading edge that is intermediate said tip fin root chord and said tip fin tip chord, said strake having first and second boundary surfaces extending from said leading edge of said strake with said first and second boundary surfaces of said strake, respectively, terminating at and being contoured to form a smooth transition with said first and second boundary surfaces of said tip fin, said strake being dimensioned and arranged for extending streamwise along the upper surface of said wing when said tip fin is mounted to said aircraft wing; and*

(f) *selecting said third predetermined angle to establish airflow vortices for maintaining boundary layer attachment along said radiused transition between said upper surface of said wing and said tip fin first boundary surface during flight of said aircraft.*

17. *The method of claim 16, wherein said leading edge of said strake extends between said leading edge of said aircraft wing and said leading edge of said tip fin, said leading edge of said strake being disposed at an angle of between approximately 55° and 75° relative to a vertical reference.*

18. *The method of claim 16, further comprising the step of selecting the distance between said tip fin root chord and said tip fin tip chord so that it lies between approximately 0.068 (b/2) and approximately 0.25 (b/2), where b/2 is the semispan of said aircraft wing.*

19. *The method of claim 18, wherein the aircraft wing on which said tip fin is mounted is for use on an aircraft having a typical cruise velocity greater than Mach 0.65 and wherein said method further comprises the step of selecting the maximum thickness ratio of said airfoil section defined by said first and second boundary surfaces of said tip fin so that it lies between approximately 0.02 and approximately $0.12 + 0.4(0.65 - M_c)$, where $M_c$ is a typical cruise velocity of the aircraft using the aircraft wing on which said tip fin is mounted.*

20. *The method of claim 19, further comprising the step of selecting the ratio of the surface area of said tip fin to the surface area of said aircraft wing so that it lies between approximately 0.092 1/(b/2) and 0.138/(b/2), where 1 is the distance between said tip fin root chord and said tip fin tip chord and b/2 is the semispan of the wing to which the tip fin is mounted.*

21. *The method of claim 20, further comprising the step of selecting the ratio between said tip fin tip chord and said tip fin root chord to lie within the range of approximately 0.25 to approximately 0.35.*

22. *The method of claim 18, wherein the aircraft wing on which said tip fin is mounted is for use on an aircraft that typically cruises at a velocity less than approximately Mach 0.65, and wherein said method further comprises the step of selecting the maximum thickness ratio of said airfoil section defined by said first and second boundary surfaces of said tip fin to be between 0.02 and 0.12.*

23. *A method of creating a nonplanar wing configuration having minimized induced drag comprising the steps of:*

(a) *providing a conventional wing of substantially planar configuration having an upper surface and a lower surface, said upper and lower surfaces of said wing intersecting and joining one another to define a wing leading edge, a wing trailing edge, and a wing tip;*

(b) *mounting a substantially trapezoidal tip fin on said wing tip so that the tip fin extends upwardly and outwardly from said wing tip at a predetermined cant angle relative to a vertical reference, said tip fin having a base boundary extending chordwise along said upper surface of said wing, a leading edge extending upwardly and rearwardly at a predetermined angle relative to the chordal plane of said wing with said tip fin leading edge intersecting said upper surface of said wing at a position aft of said wing leading edge, said* tip fin having an aerodynamically contoured upper boundary extending rearwardly from the upper terminus of said tip fin leading edge and having a trailing edge extending downwardly from the aft terminus of said upper boundary to the trailing edge of said wing, said tip fin being contoured to have a cross-sectional airfoil geometry relative to the streamwise direction throughout the distance between said tip fin base boundary and said tip fin upper boundary, said tip fin being mounted to said wing tip at a predetermined angle of incidence that positions said leading edge of said tip fin outwardly of said trailing edge of said tip fin, said tip fin being twisted over at least the lower portion thereof to gradually decrease the angle of incidence between said tip fin leading edge and said freestream direction with respect to distance along said leading edge;

(c) creating a strake between said wing and said tip fin, said strake extending streamwise between the leading edge of said wing and said leading edge of said tip fin and having an aerodynamically contoured leading edge extending upwardly and rearwardly from said leading edge of said wing to a point on said leading edge of said tip fin intermediate said tip fin base boundary and said tip fin upper boundary to angularly dispose said strake leading edge at a predetermined angle relative to a vertical reference, said strake having first and second boundary surfaces extending from said leading edge of said strake, said first and second boundary surfaces of said strake respectively terminating in and being contoured to form a smooth transition with said tip fin; and (d) selecting said predetermined angle of said strake leading edge so as to establish airflow vortices for maintaining boundary layer attachment along the junction between said tip fin base boundary and said wing.

24. The method of claim 23, further comprising the step of selecting the distance between said tip fin base boundary and said tip fin upper boundary so that it lies between approximately 0.068 (b/2) and approximately 0.25 (b/2), where (b/2) denotes the semispan of said aircraft wing.

25. The method of claim 24, said selected predetermined cant angle is less than 25°.

26. The method of claim 24, further comprising the step of selecting said angle formed between said leading edge of said strake and said vertical reference so that it lies between approximately 55° and 75°.

27. The method of claim 26, further comprising the step of selecting the ratio of the surface area of said tip fin to the surface area of said conventional wing to be between 0.092 $l/(b/2)$ and 0.138 $l/(b/2)$ where $l$ is the distance between said tip fin base boundary and said tip fin upper boundary and (b/2) denotes the semispan of said conventional wing.

28. The method of claim 27, wherein said nonplanar wing is for employment by an aircraft that typically cruises at a velocity greater than Mach 0.65, and wherein said method further comprises the step of selecting the maximum thickness ratio of said cross-sectional airfoil geometry so that it lies between approximately 0.02 and approximately $0.12 + 0.4 (0.16 - M_c)$, where $M_c$ is the typical cruise velocity of the aircraft employing such nonplanar wing configuration.

29. The method of claim 28, further comprising the step of selecting the ratio between said tip fin upper boundary and said tip fin base boundary to lie within the range of approximately 0.25 to approximately 0.35.

30. The method of claim 27, said nonplanar wing configuration is for use on an aircraft that typically cruises at a velocity less than approximately Mach 0.65, and wherein said method further comprises the step of selecting the maximum thickness of said cross-sectional airfoil geometry to lie between approximately 0.02 and approximately 0.12.

* * * * *